United States Patent [19]

Davis

[11] 4,240,372
[45] Dec. 23, 1980

[54] PRESSURE RESPONSIVE ANNUNCIATOR

[76] Inventor: Allen V. C. Davis, 5600 Alta Canyada Rd., La Canada, Calif. 91011

[21] Appl. No.: 20,717

[22] Filed: Mar. 15, 1979

[51] Int. Cl.³ .............................................. G01L 7/08
[52] U.S. Cl. .................................... 116/271; 116/285
[58] Field of Search ...................... 116/271, 272, 285; 200/83 P; 73/378.3

[56] References Cited

U.S. PATENT DOCUMENTS

| 2,134,299 | 10/1938 | Cosner | 116/285 |
| 2,824,919 | 2/1958 | Davis | 200/83 P |
| 2,953,658 | 9/1960 | Davis | 200/83 P |
| 3,908,378 | 9/1975 | Wolfe | 73/378.3 |

Primary Examiner—Gerald Goldberg
Assistant Examiner—Denis E. Corr
Attorney, Agent, or Firm—Perry E. Turner

[57] ABSTRACT

There is disclosed a pressure responsive device incorporating a snap action disc spring having arms for actuating an indicator plate with indicia thereon. In one arrangement the arms extend from the inner peripheral edge of the disc spring, and in other arrangements the arms extend from the outer peripheral edge of the spring. The indicator plate is adapted for rotational movement with lateral movements of the arms when the spring snaps, as by direct connection to the ends of the arms or by means of gearing or other provision of converting linear motion to rotary motion of a pin or shaft of the indicator plate. The plate is below a cover that has openings in which the indicia are aligned upon its rotation to the position caused by the snap action of the disc spring in response to predetermined level of pressure of fluid applied to the pressure responsive device.

8 Claims, 12 Drawing Figures

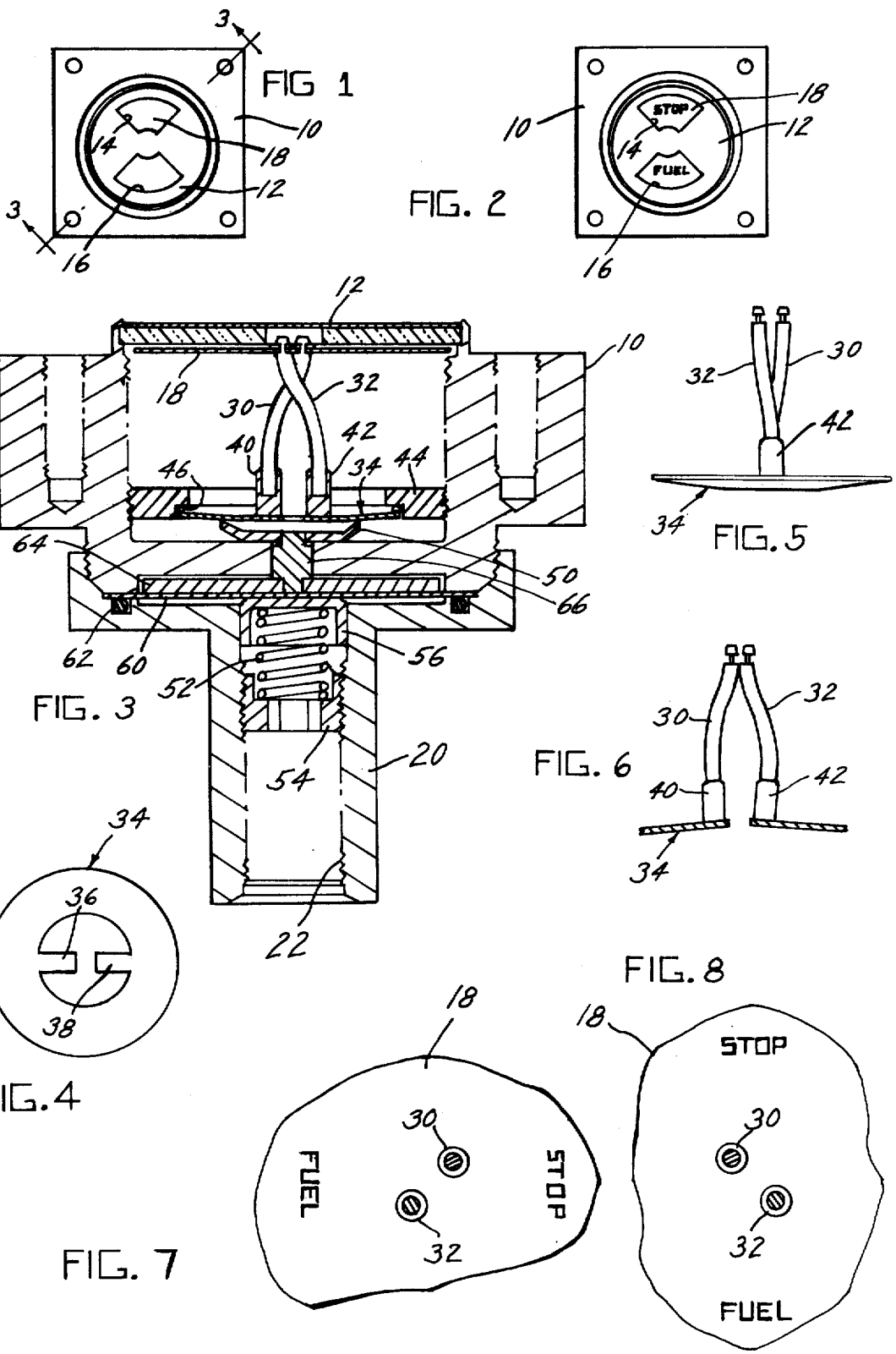

PRESSURE RESPONSIVE ANNUNCIATOR

BACKGROUND OF THE INVENTION

1. Field of the Invention

This invention relates to annunciators, and more particularly to mechanically operated indicator apparatus.

2. Description of the Prior Art

Safety requirements dictate that the occurrences of certain events cannot be signalled electrically, electromechanically, or electronically. Thus, for an indication of when a tank is filled with a volatile fuel under pressure, and fueling operations should cease, it is essential that a visible signal be effected mechanically. Further, it is highly desirable that such a mechanical annunciator be extremely sensitive and provide a reliable indication instantaneously with the pressure reaching a predetermined level.

SUMMARY OF THE INVENTION

This invention embraces a pressure responsive device in which rotation of an indicator plate element through a predetermined angle is effected by snap action of a pressure-actuated disc spring. Further, this invention embraces a pressure responsive device in which an indicator element is operated by the ends of arms extending from a snap action disc spring that is preloaded to snap upon application of a predetermined force, and which is movable via a pressure responsive element to which fluid pressure is applied. The ends of the arms undergo relative movements when predetermined pressure causes the spring to snap, and via direct connections or motion converter means from the ends of the arms to it, the indicator element rotates through the predetermined angle. Also embraced is such device wherein the indicator element and a cover coact to exhibit indicia in one position of the indicator element.

BRIEF DESCRIPTION OF THE DRAWINGS

FIG. 1 is a top plan view of a pressure responsive indicator apparatus in accordance with the invention, showing windows in a cover plate through which to view an indicator plate;

FIG. 2 is a top plan view like FIG. 1, but wherein the indicator plate has been rotated to a position wherein the indicia thereon are viewed through the windows in the cover;

FIG. 3 is a sectional view taken along the line 3—3 of FIG. 1;

FIG. 4 is a top plan view of the snap action disc spring of the indicator apparatus of FIG. 3;

FIG. 5 is a view in elevation of the arms for supporting the indicator plate, viewed from the right of the positions thereof shown in FIG. 3;

FIG. 6 is a view in elevation of the arms in which their upper ends have moved past each other with respect to the positions shown in FIG. 3, which movement effects rotation of the indicator plate through a predetermined angle;

FIG. 7 is a fragmentary top plan view of the indicator plate and the upper ends of the arms in the positions of these elements corresponding to their positions in FIG. 3, which is reflected in FIG. 1 by the absence of indicia in the windows;

FIG. 8 is a fragmentary top plan view of the indicator plate and the upper ends of the arms, wherein such upper ends have moved past each other to the positions shown in FIG. 6, as reflected in FIG. 2 by the presence of indicia in the windows due to the resultant rotation of the indicator plate;

DESCRIPTION OF ILLUSTRATIVE EMBODIMENTS

Figure 9:
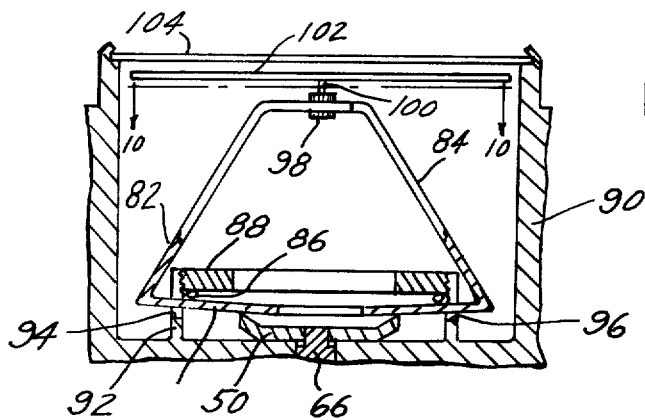
FIG. 9 is a fragmentary sectional view of a second embodiment of pressure responsive indicator apparatus of the invention, showing the arms extending from the outer periphery of the disc spring.

Referring to FIGS. 1 and 2, a body 10 has a top cover 12 in which are openings or windows 14, 16 through which to view an indicator plate 18. As shown in FIG. 2, the plate 18 is rotatable to a position wherein information carried thereby is visible in the windows 14, 16. In the illustrated example, the apparatus is used to indicate to an observer that fueling operations should cease, hence the words "FUEL" and "STOP".

Referring to FIG. 3, the body 10 has a lower cap portion 20 threaded thereon that is adapted for insertion in a fuel line from which fuel under pressure can enter the port 22 of the cap 20. When pressure of fluid in the port 22 reaches a predetermined level, the apparatus of the invention causes the indicator plate 18 to rotate through a predetermined angle to position the indicia in the windows 14, 16.

To this end in the embodiment shown in FIGS. 3-8, the indicator plate 18 is mounted on the upper ends of a pair of arms. In the example shown, such arms include rods or pins 30, 32 secured to a snap action disc spring 34, as to inner tangs 36, 38 via posts 40, 42 which are welded, brazed or otherwise secured to the tangs, such posts being portions in which the lower ends of the pins are inserted and similarly secured in place.

The disc spring 34 has its outer peripheral edge positioned by an adjustment screw member 44 threaded in the body 10 to bear against a register ring 46 that engages the edge portion of the spring 34. Such spring is suitably preloaded, as via a register plate 50 that has an edge portion engaging the body of the snap spring. The register plate 50 bottoms against the floor of the body 10, and the amount of preload is determined by the positioning of the adjustment screw 44. Additionally, a positive rate spring, shown as a helical spring 52, may be provided to adjust to the negative spring rate of the disc spring 34 and establish a desired actuation setting for operation. Such supporting and preloading of a disc spring, and use of a helical spring, are conventional and in accordance with teachings of my U.S. Pat. No. 2,824,919 for "Pressure Responsive Switch," issued Feb. 25, 1958.

The lower end of the helical spring 52 is engaged by an adjustment screw 54, and its upper end abuts the inner end of a cup-like shoe member 56, the skirt of which is slidable in the upper end of the port 22. The upper surface of the shoe 56 engages the lower surface of a member via which to translate the force of fluid pressure in the port to the disc spring. Such member may be a piston or diaphragm. In the example shown, the member is a diaphragm 60 that is clamped adjacent its edge between the cap 20 and the body 10 when the cap is screwed in place. A fluid-tight seal is provided, as via an O-ring 62 in the cap that bears against the lower surface of the diaphragm adjacent its edge. The upper surface of the diaphragm is backed by a pressure plate 64. An acutator pin 66 extends between the pressure plate 64 and the register plate 50.

Operation of the disc spring 34 is effected at a level of fluid pressure in the port 22 in accordance with the established preloading and helical spring setting, in accordance with the teachings of my aforesaid patent. In this arrangement, the snap action of the disc spring at the predetermined pressure results in upward movement of its inner portion about the register ring 46 as determined by the position of engagement of the body of the snap spring by the register plate 50.

Such upward snap of the disc spring 34 effects further separation of the confronting ends of the tangs 36, 38. This movement causes the post 40 and its pin 30 to move to the left, and the post 42 and its pin 32 to move to the right. Such movement is sufficient to cause the upper ends of the pins to move past each other from the positions shown in FIG. 3. The resultant positions are illustrated in FIG. 6.

Referring to FIGS. 7 and 8, the movements of the pins 30, 32 between the positions shown in FIGS. 3 and 6 is manifested by counterclockwise rotation of the indicator plate 18. FIG. 7 illustrates the positions of the upper ends of the pins and of the indicator plate prior to snap action of the disc spring in response to fluid pressure, corresponding to the positions shown in FIG. 3. As shown in FIG. 7, the legends "FUEL" and "STOP" are located 90° clockwise from the centers of the windows in the cover 12 (FIG. 1), and hence are not visible.

FIG. 8 illustrates the positions of the upper ends of the pins 30, 32 and the indicator plate 18 following snap movement of the disc spring upon fluid pressure in the port 22 reaching the predetermined level for effecting such action. As will be noted with reference to FIGS. 7 and 8, the pins essentially move horizontally sufficiently so that the indicator plate 18 is rotated counterclockwise through a 90° angle. Thus, the legends "FUEL" and "STOP" in FIG. 8 are in the positions corresponding to the centers of the windows 14, 16 in the cover 12, and hence are visible as shown in FIG. 2.

In the above described embodiment, as will be noted with reference to FIG. 5, which views the pins from the right in FIG. 3, the pins are bowed to opposite sides of the plane through the lower ends of both of them. This insures that the upper ends of the pins can readily pass each other without interference when the disc spring 34 is snapped.

It will be understood that when the fluid pressure in the port 22 falls below the predetermined level that effected upward snap of the disc spring, it undergoes return snap to the position shown in FIG. 3. When this occurs, the pins return to the positions shown in FIG. 3, and the indicator plate 18 rotates clockwise back from the position shown in FIG. 8 (and FIG. 2) to the position shown in FIG. 7 (and FIG. 1), thus removing the legends from the windows.

Figure 10:
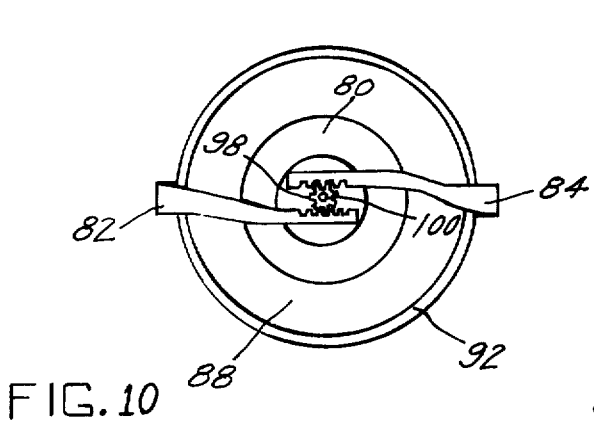
FIG. 10 is a fragmentary sectional view taken along the line 10—10 of FIG. 9.
Figure 11:
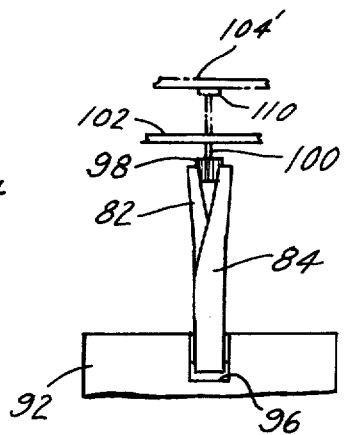
FIG. 11 is a fragmentary side elevation view of the elements shown in FIG. 10 as seen from the right side thereof.

FIGS. 9-11 illustrate an embodiment of the invention wherein a snap action disc spring 80 has arms 82, 84 extending from its outer peripheral edge. In this embodiment, the outer peripheral edge of the disc spring is the portion immediately below the register ring 86 which bears against the spring and which is engaged by the adjustment screw 88. The adjustment screw 88 and the register plate 50 function as in the previous embodiment for preloading the disc spring 80.

To facilitate the preloading and desired positioning of the arms of the disc spring 80, the housing 90 is provided with an upstanding circular rib 92 which is threaded to receive the adjustment screw in the manner shown. Also, the rib 92 is provided with diametrically opposed slots 94, 96 through which the arms 82, 84 extend. As illustrated, the bottoms of the slots 94, 96 are below the peripheral portion of the disc spring so as to permit the needed movement of such outer periphery by the adjustment screw 88 in establing the desired preloading.

As will be noted, the arms 82, 84 are bent upwards and inwards, with the upper end portions thereof being parallel and opposed. As best seen in FIG. 10, such parallel portions are provided with teeth for meshing with those of a gear 98 carried on the lower end of a pin or shaft 100 of an indicator plate 102. At its upper end, the housing 90 has a cover 104 which is like the cover 12 of the previous embodiment. The indicator plate 102 similarly has indicia to be viewed through openings in the cover 104.

When the spring 80 snaps upward in this embodiment, the toothed ends of the arms 82, 84 move outwardly. Thus, the left arm 82 in FIG. 9 moves to the left, and the right arm 84 moves to the right. Such action effects clockwise rotation of the gear 98, and hence the indicator plate 102, through a predetermined angle. In this arrangement, the indicator plate has its indicia located counterclockwise from the windows in the cover 104. Thus, the clockwise rotation of the indicator plate through the predetermined angle, upon snap of the disc spring in response to a predetermined level of fluid pressure, brings the indicia into view through the cover openings. In similar fashion, return snap movement of the disc spring 80 with fall in fluid pressure effects inward movement of the arms 82, 84, and of counterclockwise rotation of the gear 98 and indicator plate 102 to move the indicia away from view.

Figure 12:
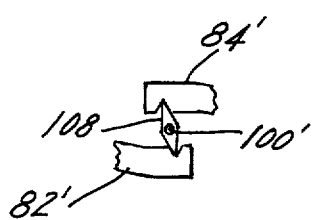
FIG. 12 is a fragmentary top plan view of a further means in accordance with the invention for imparting rotation to an indicator plate from relative movements of the arms of the disc spring.

FIG. 12 illustrates another arrangement by which to convert the linear components of motion of the ends of the arms of a disc spring (as disclosed in the preceding embodiments) into rotary motion of a shaft 100' and indicator plate (not shown) attached thereto. In lieu of teeth to mesh with a gear, the arms 82', 84' are provided with notches as shown in which are the wedge-like ends of a narrow rhombus element 108 that is fixed on the shaft 100'. As will be seen, movements of the arms 82', 84', as with the arms 82, 84 of the preceding embodiment, effects clockwise rotation of the element 108 and the shaft 100'. As indicated, the notches in the arms 82', 84' are positioned to one side of positions through which the element 108 is to be moved. The element 108 is dimensioned so that, as with the ends of the arms in the embodiment of FIGS. 1-8, and as with the gear 98 in the embodiment of FIGS. 9-11, relatively small stroke movement of the arms 82', 84' effects rotation of the element 108 through a large angle.

It should be noted that this invention embraces the use of a single arm to effect the desired rotary movement of an indicator element. For example, and referring to FIG. 11, the pin 100 may be extended, as shown in phantom, into a bearing 110 in the cover 104'. Thus, one of the arms 82, 84 may be deleted, and the single arm remaining is effective to rotate the indicator plate 102 in the desired manner.

I claim:

1. In combination:

a housing;

a snap action disc spring capable of preloading being in said housing and having inner and outer peripheral edges, said disc spring having a pair of arms extending from one of its peripheral edges;

means for overcoming said preloading of said disc spring, said overcoming means including means engaging one surface of said disc spring intermediate its inner and outer peripheral edges and being operable upon application thereto of a predetermined force to cause the preloading of said disc spring to be overcome and effect snap action thereof, said arms undergoing movement upon such snap action having components perpendicular to the axis of said disc spring;

an indicator element;

and means coupling said indicator element and said arms, said arms coacting to effect rotary movement of said indicator element in response to said components;

2. The combination of claim 1, wherein said coupling means includes direct connections of said arms to said indicator element.

3. The combination of claim 1, wherein said coupling means includes a pin extending from said indicator element, the ends of said arms having confronting edge portions, said pin extending between said confronting edge portions;

and a member fixed on said pin between said edge portions and in engagement therewith, said member being moved by said edge portions upon movement of said arms to impart rotary movement to said pin and indicator element.

4. The combination of claim 1, wherein said means to cause the preloading of said disc spring to be overcome includes a register element having an edge portion engaging said disc spring;

a pressure movable element coupled to said register element;

and means to apply fluid under pressure to said pressure movable element to cause said predetermined force to be applied thereto upon said pressure reaching a predetermined level.

5. The combination of claim 4, wherein said arms extend from the inner peripheral edge of said disc spring.

6. The combination of claim 4, wherein said arms extend from the outer peripheral edge of said disc spring.

7. The combination of claim 5 or 6, including a cover for said housing having an opening therein, said indicator element being a plate adjacent said cover, said plate having indicia thereon which is aligned with said opening upon rotation of said plate in response to snap action of said disc spring.

8. The combination of claim 7, wherein said disc spring undergoes reverse snap movement upon said fluid pressure falling below said predetermined level, said plate undergoing reverse rotation with said reverse snap movement to remove said indicia from alignment with said opening.

* * * * *